(12) United States Patent
Lee

(10) Patent No.: US 6,788,028 B2
(45) Date of Patent: Sep. 7, 2004

(54) CHARGING A BATTERY USING CONSTANT VOLTAGE AND PULSE

(75) Inventor: Seung-Won Lee, Seoul (KR)

(73) Assignee: SK Teletech Co., Ltd. (KR)

( * ) Notice: Subject to any disclaimer, the term of this patent is extended or adjusted under 35 U.S.C. 154(b) by 0 days.

(21) Appl. No.: 10/324,753

(22) Filed: Dec. 19, 2002

(65) Prior Publication Data

US 2003/0111980 A1 Jun. 19, 2003

(30) Foreign Application Priority Data

Dec. 19, 2001 (KR) .......................................... 2001-81064

(51) Int. Cl.[7] .................................................. H02J 7/04
(52) U.S. Cl. ..................................................... 320/141
(58) Field of Search .................................. 320/141, 127, 320/128, 129, 130, 139, 145, 137, 146

(56) References Cited

U.S. PATENT DOCUMENTS

| | | | | |
|---|---|---|---|---|
| 5,442,274 A | * | 8/1995 | Tamai | 320/146 |
| 6,154,010 A | * | 11/2000 | Geiger | 320/137 |
| 6,177,780 B1 | * | 1/2001 | Roy et al. | 320/128 |
| 6,313,612 B1 | * | 11/2001 | Honda et al. | 320/139 |

* cited by examiner

Primary Examiner—Pia Tibbits
(74) Attorney, Agent, or Firm—Lahive & Cockfield, LLP

(57) ABSTRACT

The present invention provides a battery charger of mobile phone capable of charging a battery rapidly and fully, by charging the battery rapidly with pulse up to a predetermined level of the charging capacity of the battery, and then by charging with constant voltage until the battery is fully charged, and a charging method for the same; the battery charger comprising: a main control means, which controls pulse voltage charging and constant voltage charging based on the charging state of the battery; a constant voltage charging control means, which controls charging of the battery with constant voltage under control of the above main control means; a pulse charging control means, which detects charging voltage of the battery and controls charging of the battery with pulse voltage based on the detected charging voltage under control of the above main control means; and a charging means, which charges the battery by outputting pulse voltage or constant voltage after DC power has been applied under control of the above pulse charging control means or the above constant voltage charging control means.

4 Claims, 4 Drawing Sheets

CHARGING A BATTERY USING CONSTANT VOLTAGE AND PULSE

RELATED APPLICATION

The current application claims priority from Korean Patent Application Number 2001-81064, which was filed on Dec. 19, 2001, the contents of which are incorporated herein by reference.

FIELD OF THE INVENTION

The present invention relates generally to a battery charger of mobile phone as well as a method of charging such battery, and, in particular, to a battery charger of mobile phone using constant voltage and pulse, as well as a high speed charging method for the same.

DESCRIPTION OF THE PRIOR ART

A mobile phone employs generally a rechargeable battery as its power source, such rechargeable battery being recharged by a battery charger, the charging time of a battery is determined by charging capacity of the battery charger.

Such a conventional battery charger for a mobile phone has a construction as illustrated in FIG. 1.

As shown in FIG. 1, a conventional battery charger comprises a power input processing part 11 which transforms high voltage AC inputted from outside into low voltage DC; a main control part 13 which controls charging of the battery 12; a constant current control part 14 which controls charging of the battery by constant current under control of the main control part 13; a constant voltage control part 15 which controls charging of the battery by constant voltage under control of the main control part 13; a charging part 16 which charges the battery 12 using the DC power inputted from the power input processing part 11 under control of the constant current control part 14 or the constant voltage control part 15; and a feedback part 17 which feeds the DC power applied by the main control part 13 back to the power input processing part 11.

The charging process with such a conventional charger is described below making reference to FIG. 2.

Upon application of AC power to the battery charger for the purpose of charging the battery 12, the power input processing part 11 transforms the AC power into DC power and then supplies the same to the charging part 16. After that, the charging part 16 charges the battery 12 first with constant current by control of the constant current control part 14, and then, with constant voltage by control of the constant voltage control part 15.

Here, the main control part 13 controls the constant current control part 14 such that the latter 14 controls to charge the battery 12 with constant current while the constant current section CC in FIG. 2 is maintained, whereby the voltage is raised to a certain level (i.e. to the level of constant voltage) during charging of the battery 12 with constant current.

When this constant current section CC for charging with constant current ends, the main control part 13 terminates charging operation of the constant current control part 14 and proceeds immediately to charge the battery 12 further with constant voltage during the constant voltage section CV by controlling the constant voltage control part 15. Here, the current is continuously reduced while the battery 12 is charged with constant voltage until the current reaches a predetermined level, at which point charging of the battery 12 stops. This constant voltage section CV stretches from the time when the constant current section CC ends to the time of completion of charging the battery 12.

As such, since the current applied to the battery 12 is reduced drastically during the battery 12 is charged in the constant voltage section CV as shown in FIG. 2, a relatively long time is required until the battery 12 is fully charged with constant voltage. Furthermore, the above divided charging of the battery 12 in constant current section CC and constant voltage section CV requires a complicated circuits construction of the conventional battery charger.

Under these circumstances, a method for charging lithium ion batteries with pulse has been proposed to improve the afore-mentioned situations. Since such method utilizes a relatively high current for charging the pulse, generating rapid chemical reactions triggered by the high current, it enables charging of a battery within a short period of time.

However, a problem with such conventional rapid charging method of batteries using pulse is that once the rapid chemical reactions triggered by the high current ceases, the batteries are charged only about 90% of their total charging capacities due to the recovering characteristics of the ions.

SUMMARY OF THE INVENTION

The present invention, conceived in view of the aforementioned problems, aims to provide a battery charger of mobile phone capable of charging a battery rapidly and fully, by charging the battery rapidly with pulse up to a predetermined level of the charging capacity of the battery, and then by charging with constant voltage until the battery is fully charged; and a charging method for the same.

In order to achieve the above objectives, the present invention provides a battery charger for charging mobile phone batteries, comprising a main control means, which controls pulse voltage charging and constant voltage charging based on the charging state of the battery; a constant voltage charging control means, which controls charging of the battery with constant voltage under control of the above main control means; a pulse charging control means, which detects charging voltage of the battery and controls charging of the battery with pulse voltage based on the detected charging voltage under control of the above main control means; and a charging means, which charges the battery by outputting pulse voltage or constant voltage after DC power has been applied under control of the above pulse charging control means or the above constant voltage charging control means.

Further, the present invention provides a method for charging a mobile phone battery for the same end, comprising a first step of charging the battery with pulse voltage; a second step, wherein the above battery is charged with constant voltage after charging of the battery with pulse voltage has been stopped, when width of the pulse voltage becomes smaller than a predetermined pulse width; and a third step, wherein charging of the above battery ceases, when the constant voltage being charged becomes smaller than a predetermined constant voltage.

DETAILED DESCRIPTION OF THE PREFERRED EMBODIMENTS

Now, a description of the preferred embodiment of the present invention is given below, making reference to the accompanying drawings.

Figure 1:
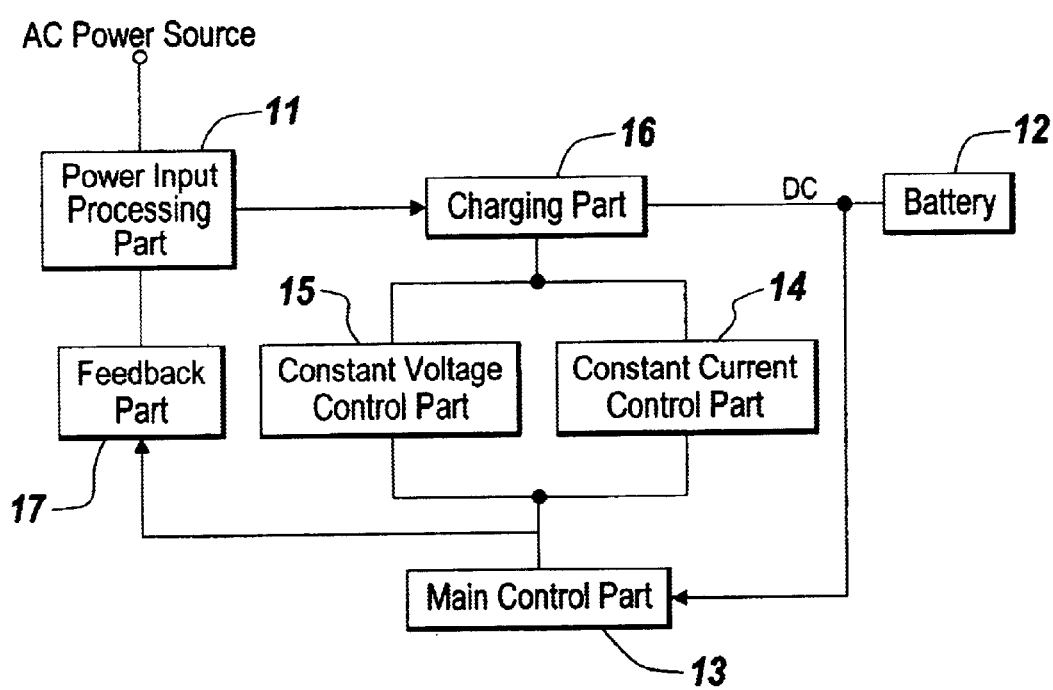
FIG. 1 shows construction of a conventional battery charger of a mobile phone.
Figure 2:
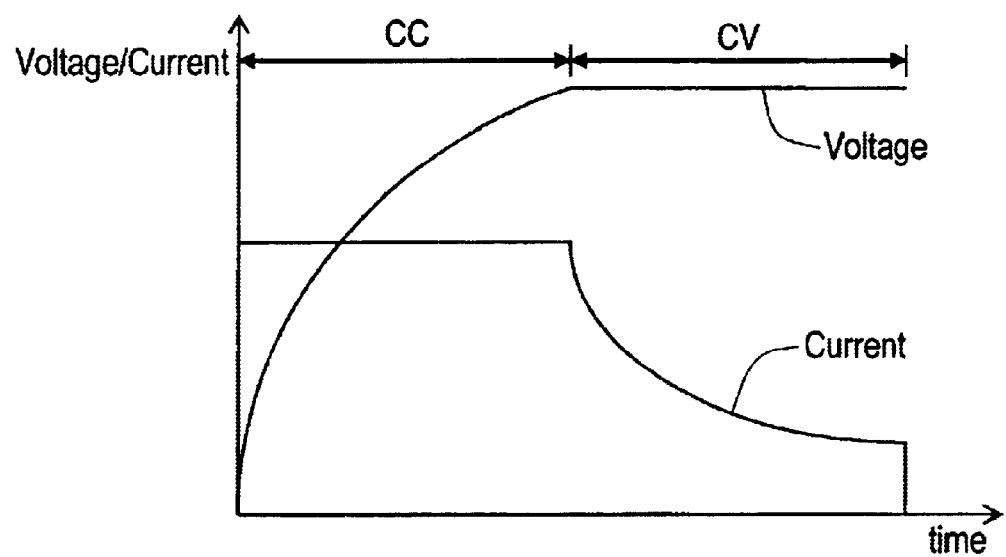
FIG. 2 is a diagram showing charging characteristics of a conventional battery charger of a mobile phone.
Figure 3:
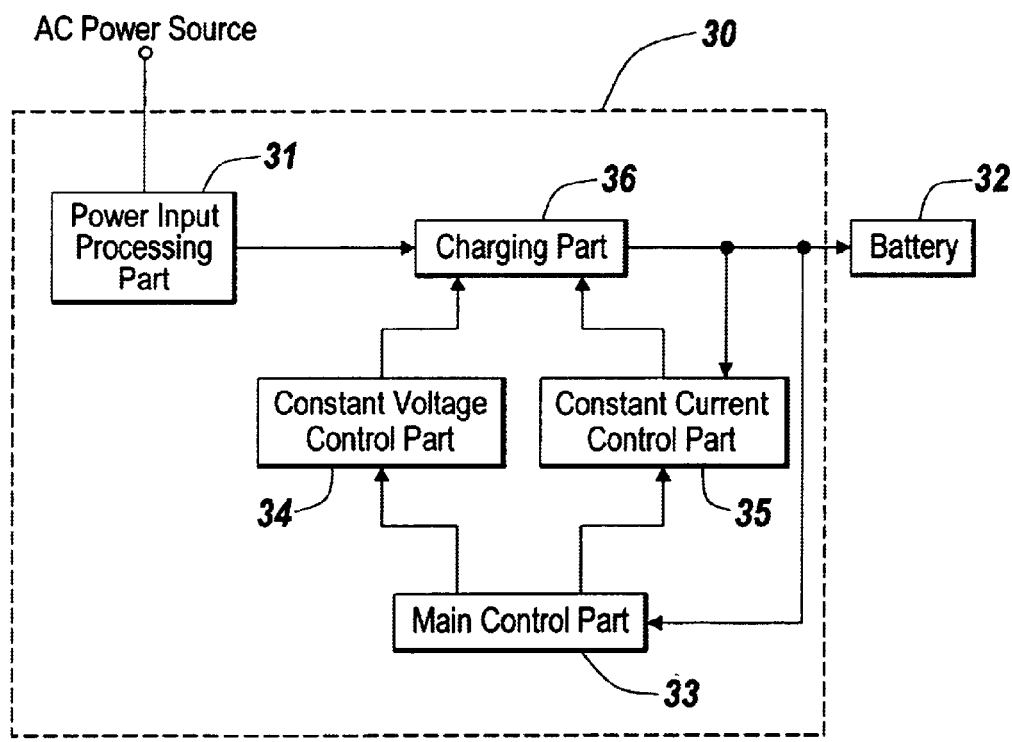
FIG. 3 shows construction of a battery charger of a mobile phone using constant voltage and pulse in accordance with one embodiment of the present invention.

FIG. 3 shows construction of a battery charger of a mobile phone using constant voltage and pulse in accordance with one embodiment of the present invention.

As shown in FIG. 3, the battery charger 30 in accordance with one embodiment of the present invention comprises a power input processing part 31 which transforms high voltage (commercially supplied voltage) AC inputted from outside into low voltage DC; a main control part 33 which controls charging of the battery 32; a constant voltage charging control part 34 which controls charging of the battery 32 by constant voltage under control of the main control part 33; a pulse charging control part 35 which detects charging voltage of the battery 32 and controls charging of the battery 32 by pulse under control of the main control part 33; and a charging part 36 which charges the battery 32 using the DC power inputted from the power input processing part 31 under control of the constant voltage charging control part 34 or the pulse charging control part 35.

The charging operation of a battery charger as per the present invention having the above construction is described in detail below.

Upon application of AC power to the battery charger for the purpose of charging the battery 32, the power input processing part 31 transforms the AC power into DC power and then supplies the same to the charging part 36.

After that, the charging part 36 charges the battery 32 first with voltage in form of pulse (hereinafter to be called 'pulse' or 'pulse voltage') by control of the pulse charging control part 35 until the battery 32 is charged to a predetermined level of its total charging capacity. For example, the charging part 36 can charge the battery 32 with pulse voltage until about 90% of the charging capacity of the battery 32 has reached.

Here, the main control part 33 determines charging state of the battery 32 based on the changes in pulse width of the pulse voltage applied to the battery 32 from the charging part 36. To elaborate, the main control part 33 determines that the battery 32 is charged about 90% of its capacity when the pulse width of the output voltage of the charging part 36 becomes equal or smaller than the reference pulse width it stores after having compared the pulse width of the output voltage of the charging part 36 with the above reference pulse width; then, stops charging the battery 32 with pulse voltage and controls to start charging the battery 32 with constant voltage.

When the main control part 33 thus determines charging level of the battery 32 using width of the pulse voltage outputted to the battery 32 from the charging part 36 and controls the constant voltage charging part 34 to charge the battery 32 with constant voltage, the charging part 36 charges the battery 32 by outputting constant voltage under control of the constant voltage charging control part 34.

As the pulse charging control part 35 controls output operation of the charging part 36 by repeatedly outputting high signals and low signals for a predetermined period of time depending on the charging voltage outputted from the charging part 36, the charging part 36 charges the battery 32 by outputting pulse voltage, whereby the pulse charging operation of the pulse charging control part 35 continues until the main control part 33 stops it. Here, the main control part 33 compares width of the pulse voltage outputted from the charging part 36 with the above reference pulse width, and controls the pulse charging control part 35 to charge the battery 32 with pulse voltage if width of the charging pulse is larger than the above reference pulse width.

Figure 4:
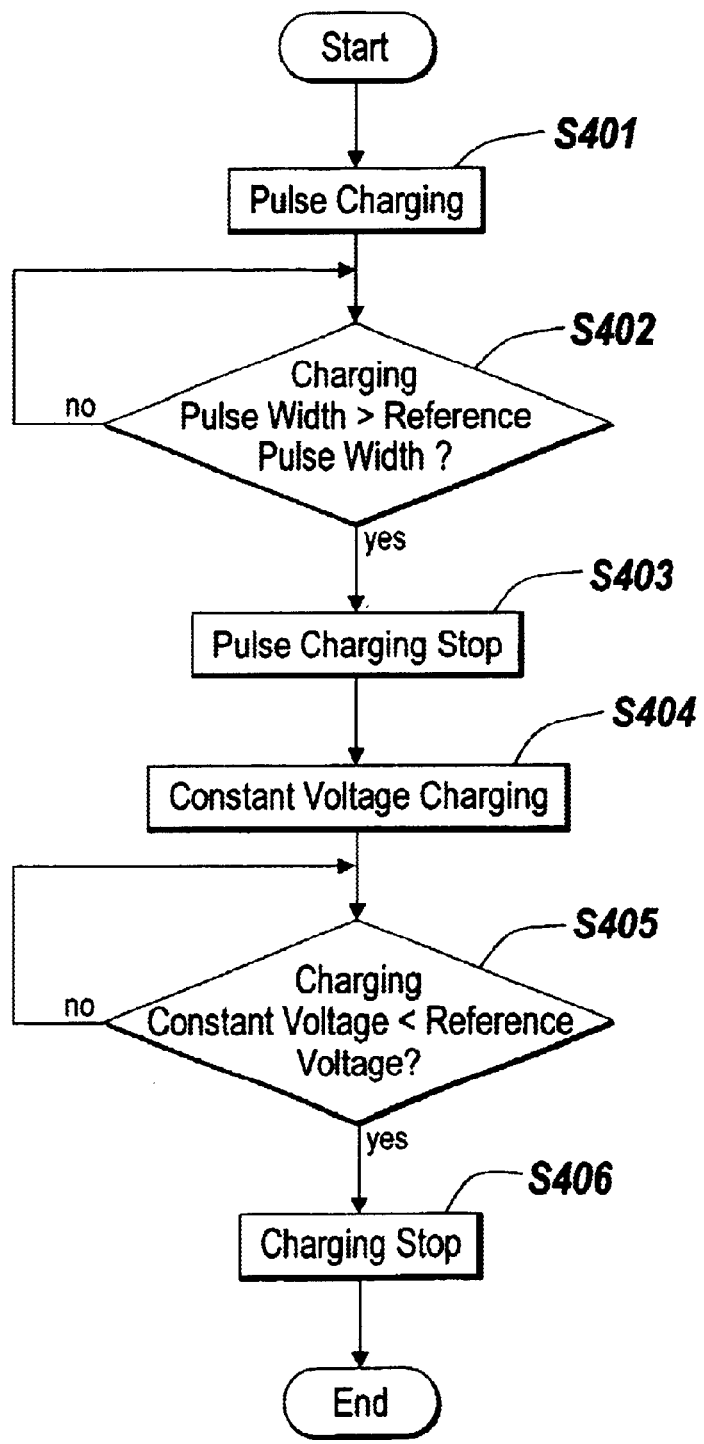
FIG. 4 is a flowchart illustrating a high speed charging method of a battery charger of a mobile phone using constant voltage and pulse in accordance with one embodiment of the present invention.

FIG. 4 is a flowchart illustrating a charging process of a battery charger as in FIG. 3 in accordance with the present invention.

As shown in FIG. 4, the main control part 33 controls the pulse charging control part 35 to charge the battery 32 with pulse voltage at the initial stage of charging the battery 32, whereupon the charging part 36 charges the battery 32 by outputting pulse voltage under control of the pulse charging control part 35 (S401).

While the battery 32 is charged with pulse voltage, the main control part 33 determines whether width of the charging pulse is smaller than the prior set reference pulse width (S402), and the pulse charging control part 35 continues charging the battery 32 with pulse voltage if width of the charging pulse is larger than the reference pulse width.

If, however, width of the charging pulse is smaller than the reference pulse width, the main control part 35 stops charging operation of the pulse charging control part 35 (S403), and then controls the constant voltage control part 34 to charge the battery 32 with constant voltage, whereupon the charging part 36 charges the battery 32 by outputting constant voltage under control of the constant voltage charging control part 34 (S404).

While the battery 32 is charged with constant voltage, the main control part 33 determines whether the charging constant voltage outputted to the battery 32 from the charging part 36 is smaller than a prior set reference constant voltage (S405), and continues to charge the battery 32 with constant voltage if the charging constant voltage is larger than the reference constant voltage.

If, however, the charging constant voltage is smaller than the reference constant voltage, the main control part 33 determines that the battery 32 is fully charged and stops charging of the battery 32 (S406).

Although the present invention has been described above with reference to the preferred embodiments, the scope of the rights of the subject invention is not restricted thereto, but rather shall be determined by the claims attached herein below and their equivalents, allowing various alterations, modifications, and adjustments, as those skilled in the art will understand.

As described above, the present invention allows rapid and full charging of a mobile phone battery by charging the battery with pulse to a predetermined level of the charging capacity of the battery, and then, with constant voltage, thus, can enhance commercial value of the product substantially.

What is claimed is:

1. A battery charger comprising:
   a main control means, which controls pulse voltage charging and constant voltage charging of a battery based on the charging state of said battery;
   a constant voltage charging control means, which controls charging of said battery with constant voltage under control of said main control means;

a pulse charging control means, which detects voltage of said battery and controls charging of said battery with pulse voltage based on said detected voltage under control of said main control means; and a charging means, which charges said battery by outputting pulse voltage or constant voltage after DC power has been applied under control of said pulse charging control means or said constant voltage charging control means, wherein said main control means controls the charging means to charge said battery with pulse voltage if pulse width of the charging pulse voltage outputted from said charging means is larger than a reference pulse width, while it controls the charging means to charge said battery with constant voltage if width of the charging pulse voltage is smaller than said reference pulse width, wherein said main control means controls the charging means to cease charging said battery with the constant voltage when said constant voltage of the battery becomes smaller than a reference constant voltage.

2. A method for charging a battery comprising:

a first step of charging said battery with pulse voltage;

a second step, wherein said battery is charged with constant voltage after charging with pulse voltage has been stopped, when pulse width of said pulse voltage becomes smaller than a reference pulse width; and a third step, wherein charging of said battery ceases, when said constant voltage of the battery becomes smaller than a reference constant voltage.

3. The method for charging a battery as set forth in claim 2, wherein said second step comprises:

step 2-1, wherein a battery charger determines whether pulse width of said pulse voltage is smaller than said prior set reference pulse width while said battery is being charged with pulse voltage;

step 2-2, wherein said battery charger stops charging said battery with pulse voltage if it is determined at said step 2-1 that width of said pulse voltage is smaller than said prior set reference pulse width, and charges said battery with constant voltage; and step 2-3, wherein said battery charger continues charging said battery with pulse voltage if it is determined at said step 2-1 that width of said pulse voltage is larger than said prior set reference pulse width.

4. The method for charging a battery as set forth in any one of claim 2 or claim 3, wherein said third step comprises:

step 3-1, wherein said battery charger determines whether said constant voltage is smaller than a prior set reference constant voltage while said battery is being charged with constant voltage;

step 3-2, wherein said battery charger stops charging said battery if it is determined at said step 3-1 that said constant voltage is smaller than said prior set reference constant voltage; and step 3-3, wherein said battery charger continue to charge said battery with constant voltage if it is determined at said step 3-1 that said constant voltage is larger than said prior set reference constant voltage.

* * * * *